(No Model.) 3 Sheets—Sheet 1.

T. O. PERRY.
WINDMILL.

No. 451,225. Patented Apr. 28, 1891.

WITNESSES:
Mary L. Emerson
Wm A. Wolcott

INVENTOR:
Thomas O. Perry (No Model.) 3 Sheets—Sheet 2.
T. O. PERRY.
WINDMILL.
No. 451,225. Patented Apr. 28, 1891.
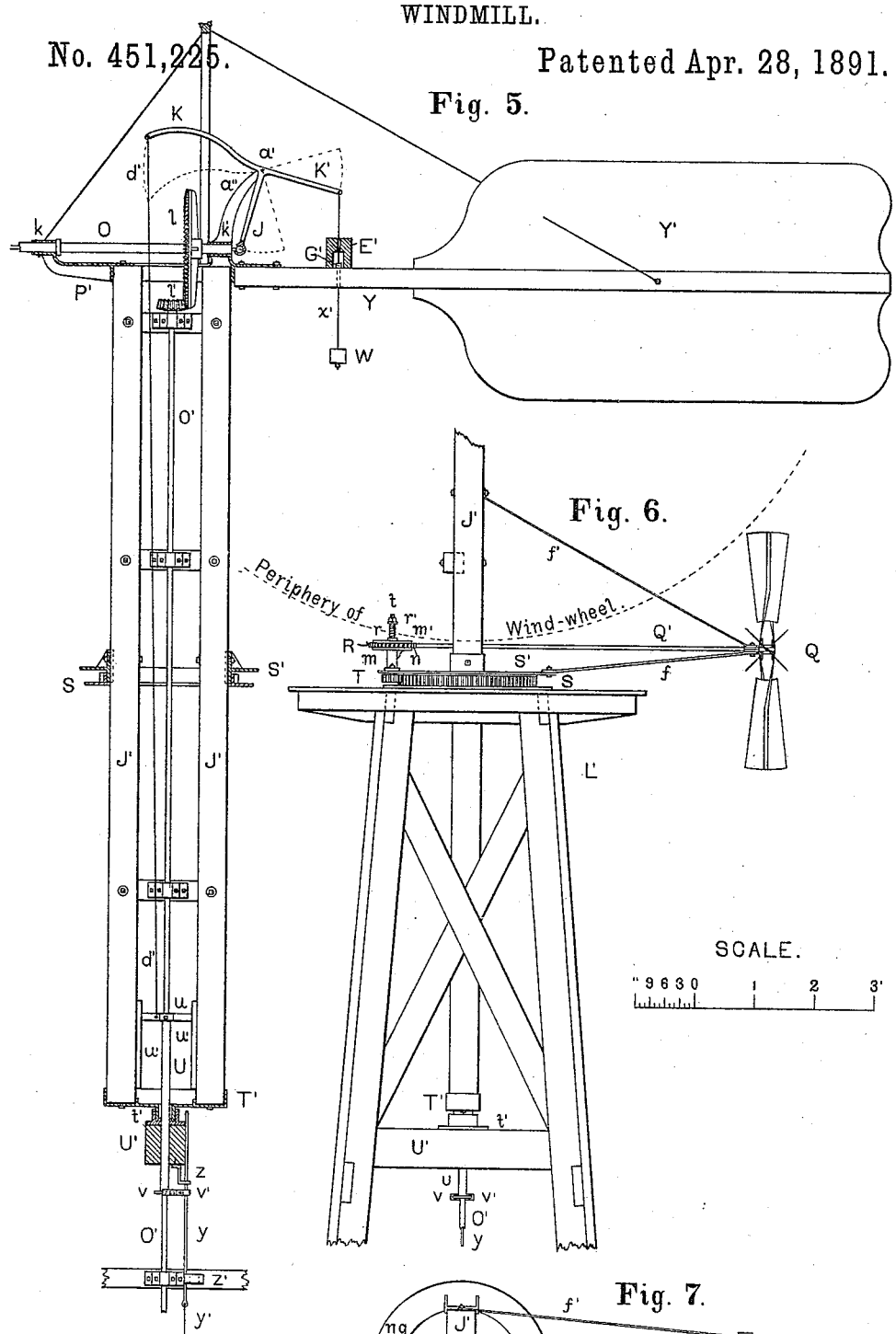
WITNESSES:
Fred H. Beach
Charles S. Leeper
INVENTOR:
Thomas O. Perry.

(No Model.)  3 Sheets—Sheet 3.

T. O. PERRY.
WINDMILL.

No. 451,225. Patented Apr. 28, 1891.

WITNESSES:
L W Moyer
Mae Guernsey

INVENTOR:
Thomas O. Perry.

UNITED STATES PATENT OFFICE.

THOMAS O. PERRY, OF BATAVIA, ILLINOIS.

WINDMILL.

SPECIFICATION forming part of Letters Patent No. 451,225, dated April 28, 1891.

Application filed November 30, 1883. Serial No. 113,119. (No model.)

*To all whom it may concern:*

Be it known that I, THOMAS O. PERRY, a citizen of the United States, residing at Batavia, in the county of Kane and State of Illinois, have invented a new and useful Windmill, of which the following is a specification.

My invention relates to certain improvements in windmills; and it consists in the construction and combination of parts, as will hereinafter appear.

The mechanism by means of which these various objects are attained is illustrated in the accompanying drawings, in which—

Figure 1:
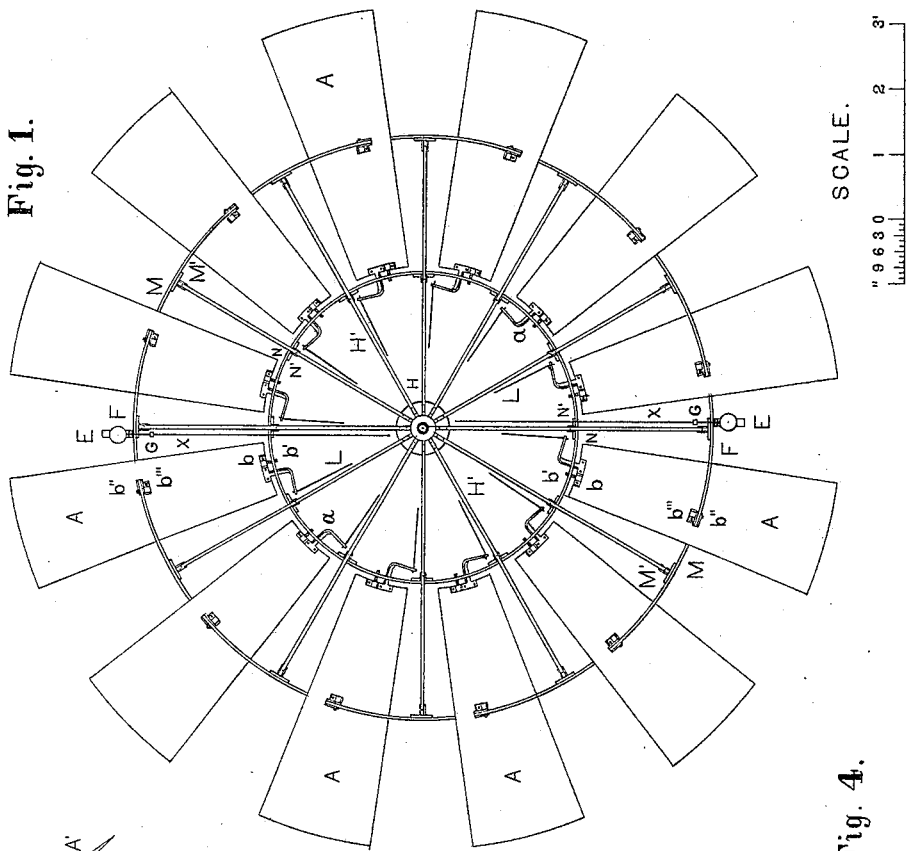
Figures 2, 3, 4:
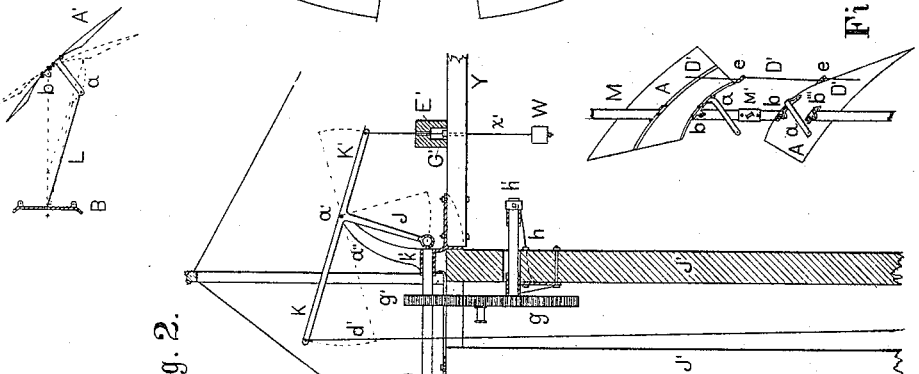
Figure 8:
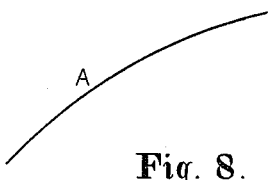
Figure 9:
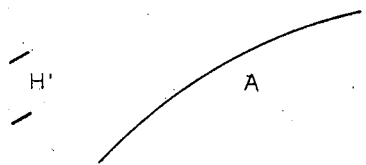
Figure 10:
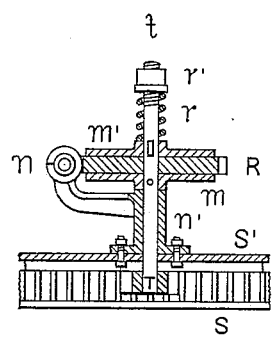
Figure 11:
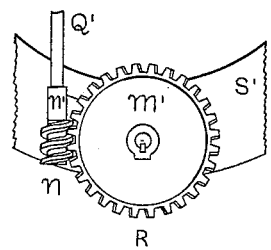
Figure 12:
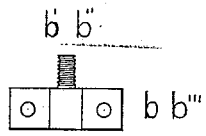
Figure 13:
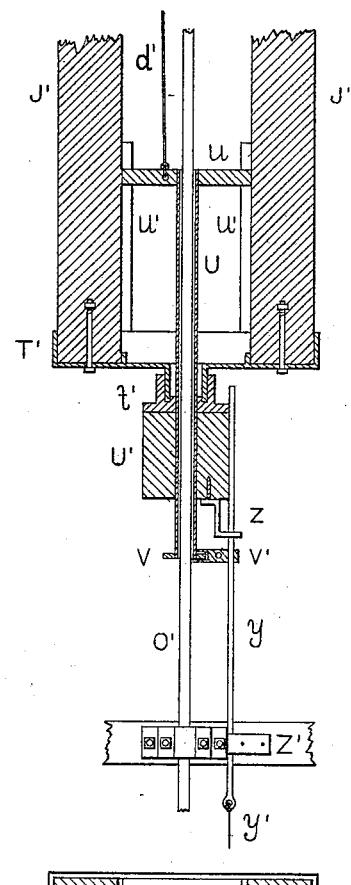

Figure 1 represents a front view of the wheel, showing the sails A and their supporting-frame, and omitting most of the regulating devices, except the centrifugal weights F and rods $x$ to which they are attached. Fig. 2 is a vertical side elevation of the windmill, shown partially in section through the center of the wheel, omitting all the sails but two, and showing the complete regulating devices, and also showing a special device for operating a pump. Fig. 3 represents a single detached sail as it would appear projected from the center of the wheel in the direction of its radial axis, and also the connecting-head B and link L in their proper relative position as regards the sail. Fig. 4 shows two adjacent sails A with special connecting-links D', and a portion of the outer band M, as they would appear projected from the center of the wheel in the direction of an equidistant radius. Fig. 5 shows, partially in section through the center, a side view of a portion of the windmill as geared for driving machinery and supported on a revolving tower-top, also the shut-off device. Fig. 6 shows a partial front view of the revolving tower-top with special device for keeping the wheel to the wind, and also a portion of the stationary tower. Fig. 7 is a plan showing a portion of the revolving tower-top, and special device for keeping the wheel to the wind. Fig. 8 is a section cutting a pair of sails and intervening arms between the outer and inner bands of the wheel in a plane Z Z perpendicular to a radius midway between the two sails, so as to show the angles made by the faces of the flat arms with the plane of the wheel, as well as the position of the arms with reference to the sails on either side. Fig. 9 is an enlarged sectional view of the matter shown in Fig. 5, below the irregular line $Z^2 Z^2$. Fig. 10 is an enlarged sectional view taken in a vertical plane, including the axis of shaft $t$ and perpendicular to shaft Q', as indicated by the line $Z^3 Z^3$. Fig. 11 is a plan of the parts shown in Fig. 10. Fig. 12 shows an elevation and plan of a sail-hinge. Fig. 13 is a horizontal section through $Z^4 Z^4$ of Fig. 9.

Each sail A is supported by two hinges $b$ $b'''$, which fasten it to the bands M N. The outer band M passes through the sails and is fastened to the outer extremities of arms H'. Each arm H' is made of two pieces, which diverge from the outer band M to the double flanged hub H, to which the two branches are fastened, thus forming a triangle with the hub for a base. The inner band N is fastened to cross-pieces N', attached to the arms H'. The hub H is secured to the hollow shaft O, upon which the wheel turns, the shaft O being supported in boxes $k$ $k'$, attached to a suitable supporting-frame P', fastened on top of the two masts J' J', which constitute part of a revolving tower-top free to turn on a vertical axis, as required, for allowing the wheel to face the wind from any direction. A vane Y', attached to the frame P', may be used in the usual way for keeping the wheel to the wind; also, the bevel-gear $l$, attached to the hollow shaft O, and pinion $l'$, attached to the vertical shaft O', may be used in the usual way for driving machinery.

In order that the sails A may be turned upon their hinges and held at any desired angle of weather their inner ends are provided with arms $a$, to the ends of which are hinged regulating-rods L, whose other ends are rigidly fastened to the connecting-head B, so that all the sails may be turned at the same time and in the same manner by moving the connecting-head B backward or forward in the direction of the axis of the shaft O, with which the connecting-head is concentric. The regulating-rods L are connected with the sail-arms $a$ in hinges whose axes are parallel with the axes upon which the sails A turn.

For moving the connecting-head B as required for changing the angle of weather, a lever C is hinged at one end to a support N'', fastened to the arms H', and the other end of the lever C is connected by means of a link D to the connecting-head B, which is moved first forward and then backward by turning the hinged lever C continually in one direction on its axis from the position shown in the drawings, Fig. 2, past the position in which the lever and link would be parallel to each other or in line, and the movement thus imparted to the connecting-head B changes the angle of weather of the sails first from a greater to a less angle and then to a greater angle, as required for the accomplishment of our first object.

As shown in the drawings, the angle of weather is about forty-five degrees, which angle is favorable for starting the wheel from a state of rest; but if the lever C is moved forward to a position parallel to or in line with the link D the sails will be set at a less angle of weather, (indicated by dotted lines in Fig. 3,) which is more favorable for the performance of work when the wheel is in motion, and if the lever C is moved farther in the same direction around its axis the angle of weather will increase, as required, for retarding the speed of the wheel in excessive winds and the lever C may be turned still farther in the same direction until the angle of weather becomes ninety degrees, in which position the wind will cease to act upon the sails so as to turn the wheel.

For turning the lever C upon its axis, as required, a short arm $d$ is rigidly attached to the lever C, and this short arm $d$ is connected by means of a link B' with a rod P, as shown. The rod P passes loosely through the hollow shaft O and is connected with the elbow-lever J K by means of a ball-and-socket joint, which leaves the rod P free to turn with the wheel, while at the same time it may be moved forward or backward by means of the elbow-lever J K. The elbow-lever J K is fulcrumed at $a'$ to a suitable support $a''$, fastened to the frame P, as shown, and one arm K is connected with the rod $d'$, by pulling which the wheel may be stopped at any time or the sails set at any desired angle by an operator below. By using an additional arm K', attached to the elbow-lever J K at right angles to the arm J, a weight W may be suspended from the end thereof by means of a rod $x'$. This weight W will serve to keep the sails in the position most favorable for starting the wheel from a state of rest. When the lever C is parallel to or in line with the link D, the sails are supposed to be set at the angle most favorable for performing work, and it will be observed that the action of the wind upon the sails is powerless to move them from that position. The hinges $b\ b'''$ may be so placed with reference to the contour of the sails A that the action of the wind alone will tend to keep the sails at the angle of about forty-five degrees with the relative direction of the wind, or at such other angle as may be desired, so that when the wheel is at rest the wind will tend to set or hold the sails at the angle most favorable for starting motion; but as soon as the wheel commences to turn the relative direction in which the wind meets the sails is changed and tends to make the angle of weather less until the link D and lever C become parallel to or in line with each other. If the wheel stops on account of suspension of wind, it may be assisted to start again by pushing up on the rod $d'$, or by otherwise setting the sails at the angle favorable for starting in the least wind; or the hinges $b\ b'''$ may be so placed with reference to the contour of the sails that the action of the wind, in conjunction with the action of the weight W, will tend to keep the sails at an angle of about forty-five degrees with the relative direction of the wind, or at such other angle as may be desired, in which case the action will be the same as before in setting the sails at the best angle for work; but if the motion of the wheel should be suspended for want of wind the weight W will act to move the lever C and link D out of position in line with each other and then act in conjunction with the wind to set the sails at the best angle for again starting the wheel, thus rendering unnecessary the assistance of an attendant.

We have so far provided for assisting the wheel to commence motion and for setting the sails at the best angle for work while in motion, either automatically or with the aid of an attendant. It remains to provide for automatically checking the speed of the wheel in excessive winds or when the work to be performed does not require all the power that the wheel would give with the sails set at the best angle for work. For this purpose the lever C is connected with the inner end of the radial rod X, which carries a centrifugal weight F at its outer extremity. The rod X passes loosely through a hole in the end of a spring E, which is secured at its other end to the frame of the wheel. The spring E is kept under some degree of tension by a stop against which the free end presses. A shoulder G on the rod X is so placed as to come against the free end of the spring E as soon as or a little before the lever C is drawn into the position parallel to or in line with the link D by the centrifugal action of the weight F. When the wheel is at rest, the action of the weight W is to keep the sails at the angle most favorable for starting motion; but when the wheel turns the centrifugal force of the weight F lifts the weight W and pulls the lever C into line with the link D, when the shoulder G on the rod X comes in contact with the spring E, which arrests further movement of the lever C, holding the sails at the best angle for work until the speed of the wheel is further increased sufficiently to make the additional centrifugal force of the weight F greater than the tension of the spring E, when the movement of the lever C around its axis is continued, causing the angle of weather to increase so as to present the edges of the sails more to the wind, thus preventing the speed of the wheel exceeding what is necessary to cause a balance between the centrifugal force of the weight F and the forces which act against it. Of course the speed which the wheel may attain will depend largely on the initial tension and character of the spring E.

If the hinges $b\ b'''$ are so placed with reference to the contours of the sails that the action of the wind on the wheel at rest tends to keep the sails at the best angle for starting motion, the weight W may be dispensed with; but in that case, in order that the action of the wind may bring the sails back to their proper angle for starting, the stop G should be so placed on the rod X that it will come in contact with the spring E a little before the lever C and link D are brought into line with each other. Otherwise an attendant might be required to set the sails in their best starting position if for any cause the wheel should cease to turn.

Instead of using the spring E and stop G on the rod X, I may substitute therefor a simple guide for the rod X' and a reserve weight E' and a stop G' on the rod X'. The rod X' passes loosely through the vane-bone Y, on which rests the reserve weight E', through which also the rod X' loosely passes. The stop G' is so placed on the rod X' in a recess on the under side of the weight E' that it is arrested in its upward movement by the reserve weight when the lever C and link D are brought into line with each other—that is, after the sails have assumed the angle best for work further change of angle is prevented by the reserve weight E', unless the wheel acquires such increased speed as to cause the additional centrifugal force of the weight F to lift the reserve weight E', which acts in precisely the same manner as the spring E, except that the reserve weight acts as a more constant resistance than does the spring.

The reserve weight E' may be used in conjunction with the spring E, or to add resistance to the centrifugal action of the weight F either before or after the lever C is brought in line with the link D, as might be desired on account of the centrifugal force of the weight F varying as its distance from the center of the wheel changes, or on account of the varying action of the wind upon the sails due to change in angle of weather.

The amount of motion which the wheel must acquire before the angle of the sails will change from the angle best for starting to the angle best for work, and the additional speed which may be attained before the sails are turned on their axes, so as to prevent excessive motion, will depend on the size and position of the weights F, W, and E', or the initial tension and character of the spring E, and on the size and shape of the sails A and the position of their axes. If but one centrifugal weight F is used, it would be well to counteract the effect of gravity upon it by means of a counter-balance F', attached to an extension C' of the lever C, as it is only the centrifugal effect of the weight F that is wanted; or two centrifugal weights F may be used on opposite sides of the wheel, so that the action of gravity on one is counteracted by that on the other.

The angle at which the sails should be set in order to start the wheel with the least amount of wind, and the angle best for work when the wheel is in motion, depend somewhat upon the character of the sails; but the angle of weather best for work is always considerably less than the angle of weather best for starting the wheel from a state of rest.

Changing the angle of weather for the purpose of checking speed or stopping motion by means of a connecting-head and other connecting parts is not new; but heretofore no regulating device has been used which makes a distinction between the best angle for starting the wheel and the best angle for work when the wheel is in motion, or, in other words, the lever C has never before been used in a position parallel to or in line with the link D for placing the sails of a windmill at the best angle for work as distinguished from the best angle for starting the wheel; nor has the lever C ever before been used in a windmill and made to turn about its axis in such a manner as to pass the position in which the lever C and link D are parallel to or in line with each other.

As already stated, the regulating-rods L are rigidly attached to the connecting-head B and are connected with the sail-arms $a$ by hinges whose axes are parallel to the axes on which the sails turn. It will also be noticed (see Fig. 3) that on account of their rigid connection with the connecting-head B the regulating-rods L must spring somewhat sidewise to accommodate the circular movement of the sail-arm $a$; but, as the regulating-rods L are long, their elasticity will readily permit their necessary springing sidewise, and their rigid connection with the connecting-head B reduces the number of joints between the sails and connecting-head to a minimum, thus materially increasing durability and saving lost motion due to wearing of joints. The regulating-rods L only need to spring sidewise. In the direction of the axes of the sails they may be made sufficiently stiff to support the connecting-head B in a central position with reference to the wheel, in which office they may be also aided by the hinges connecting the regulating-rods L with the sail-arms $a$. Thus the slide-head B may be supported entirely by the regulating-rods L, connected with the sail-arms $a$, so that it will not need to slide upon the rod P.

To still further insure unity of action and stability of the sails in any position to which they may be turned upon their axes, and to further aid in supporting the connecting-head B in its central position independently of the rod P, the sails may all be linked together by means of the links D', which connect each sail with the adjacent sails on either side, as shown in Fig. 4.

To the edge of each sail is fastened a piece e, perforated by two holes, one of which is nearer to the axis of the sail than the other. These holes receive the ends of the links D' in symmetrical order, so that one end of each link connects with an inner hole and the other end with an outer hole.

The distance between the two holes in the pieces e and their position with reference to each other should be such that the distance between the inner hole of one piece e and the outer hole of another piece e joined by the same link, may remain practically constant for the different positions of the sails as they are all turned together upon their axes. This may be practically accomplished if the piece e does not swing through too great an arc and moves mostly in a quadrant on one side of a plane containing both the axis of the wheel and the axis of the sail to which the piece e is fastened; but if the two holes in the piece e were at the same distance from the axis of the sail, or if the piece e contained but one hole to receive the adjacent ends of two links, the distance between two holes connected by the same link D' would change so much as to interfere with the turning of all the sails in unison, as required. This cramping would be due to the fact that the piece e recedes farther from the axis of the wheel as it turns away from a plane containing both the axis of the sail and the axis of the wheel; hence the need of an inner and an outer hole in each of the pieces e, as explained above.

Having provided for supporting the connecting-head B independently of the rod P, I am also enabled to provide for supporting the rod P independently of the hollow shaft O—that is, without having it touch the hollow shaft O—by using two or more sets of links D, levers c, with arms d and links B' on opposite or different sides of the rod P, for in this way the connecting-head B is made to hold the several arms d all at the same angle with the axis of the wheel, and the links B' connecting with these arms being all of the same length place the rod P equidistant from the ends of the arms d. The rod P is thus held in position central with the wheel independently of the hollow shaft O at all times, except when the lever C comes in line with the link D; but, as this position of lever and link is not assumed except when the wheel is in motion, the centrifugal action of the weights F will keep the several arms d in similar positions. Also, the action of the weight W by keeping the links B' under tension would prevent the several arms d from assuming dissimilar positions when the lever C and link D are in line with each other; but any small displacement of the rod P which might happen in this particular case would do no especial harm. The point to be gained is that the rod P does not need to be guided by the hollow shaft O, and as it is supported at its other end by the lever J the rod P is entirely supported without touching the hollow shaft O, thus avoiding sliding friction, in accordance with our third object.

It is desirable that the resistance of the air against the arms H', acting to retard the motion of the wheel should be reduced as much as possible, and also that the arms H' should obstruct the passage of air through the wheel as little as possible. To this end the arms H' are made flat and thin and set at an angle with the plane of the wheel, so as to present their thin edges toward the relative direction of the wind when the wheel is in motion. The arms H' are attached, as already described, to the outer band M, which is made stiff, so as to resist compression, the thin arms H' being subjected to tension as is needed to give them support and stiffness. The inner band N is also made stiff and rigidly fastened to the cross-pieces N', so as to assist in supporting and stiffening the thin arms H'.

The band M may be made all in one piece or in segments joined to each other and to the arms H' by means of pieces M'. The band N may also be made either in one piece or in segments joined by fastening to the cross-pieces N'.

A sail-hinge b or b''' may be conveniently made by bolting to the sail a piece having a cylindrical projection b' or b'', on which a thread is cut, so that it may be screwed into a hole in the band M or N, topped for the purpose. The outer hinge b''' and inner hinge b may both be made in the same way; but the outer hinge b''' is preferably placed inside of the band M, while the inner hinge b is placed outside of the band N.

The object in threading the cylindrical projections b' b'' of the hinges b b''' is to enable their positions with reference to the bands and to the bolt-holes in the sails to be readily adjusted, so that there will be no motion of the sails in the direction of their axes due to looseness of the hinges.

The method of setting the hinges to a sail would be to first screw one of a pair into the band far enough, so that when bolted on the sail will be placed at its proper distance from the axis of the wheel. Then the other hinge is screwed into the band far enough so that the bolt-holes in the hinge and in the sail will match before bolting the hinge to the sail; or the hinges may be made to either press or pull slightly on the bands, and the threads, if V-shaped, will act as conical bearings to prevent or take up lost motion. It will be noticed, too, that the threads on the cylindrical projections of the hinges will act as conveniently small shoulders, which will turn with less friction than broader shoulders, which would otherwise need to be provided.

The sail-arm a is first carried in toward the axis of the wheel and then bent at right angles to the axis of the sail to which it is fastened, so that the regulating-rod L connected therewith may not come in the way of the band N.

As already stated, a vane Y' may be used in the ordinary way for keeping the wheel to the wind. The vane Y' alone is generally sufficient for small windmills, but in case of large windmills, especially when geared in the ordinary way for driving machinery, a vane alone large enough to be efficient, would expose so much surface to the action of the wind as to endanger the structure in furious gales; otherwise the cost of making the structure strong enough would be excessive.

In geared windmills the torsion of the upright-shaft O' acts with varying force to turn the wheel out of wind and renders the vane Y' more or less inefficient. These considerations have led to the adoption in some cases of a more efficient device for keeping the wheel to the wind, constructed substantially as follows: A small wind-wheel Q, with fixed sails, conveniently called a "tail-wheel," is fastened to a horizontal shaft Q', supported in suitable bearings $q\ q'$ at right angles to the axis of the large wind-wheel by means of a frame $f f'$ fastened to the revolving tower-top, which consists of the two masts J' and other parts rigidly connected with them. The masts J' support the frame P', and are supported at their lower ends by the casting T', to which they are fastened, and which has on its under side an annular projection fitting so as to turn freely in a socket $t'$ which supports the weight of the revolving tower-top and windmill. The socket $t'$ rests on a timber U', secured to the stationary tower L'. The two masts are also fastened inside of an annular casting S', which fits so as to turn freely inside of another annular casting S, secured to the stationary tower L'. On the outside of the annular casting S are teeth, as in a spur gear-wheel, into which work the teeth of a pinion T, fastened to a short vertical shaft $t$, supported in a suitable bearing fastened to the annular casting S'. The vertical shaft $t$ also carries a worm-wheel R, which engages with a worm $n$ on the horizontal shaft Q', which is prevented from moving in the direction of its axis by suitable shoulders. Now if the wheel does not receive the wind as it should from that point of the horizon in a vertical plane containing its axis, the tail-wheel Q will receive the wind on one side or the other and will be turned accordingly in one direction or the other on its axis, thus causing the tower-top to turn by means of gears, &c., until the tail-wheel Q no longer receives the wind on either side, in which position the wheel will face the wind as it should. This use of the tail-wheel Q substantially as we have so far described is not new; but in previous constructions the tail-wheel Q has been so connected through intervening parts with the fixed annular casting S that the revolving tower-top could not turn without also causing the tail-wheel Q to revolve on its axis, and vice versa—that is, the connections of the tail-wheel Q, worm $n$, worm-wheel R, and pinion T with their respective shafts have been rigid as regards turning on their axes. Hence a sudden shifting of the wind in a gale was liable to wrench the tower-top and severely strain the various connections through which the wheel was held to the wind, thus necessitating much greater strength of the various parts than was required to enable them to counteract the torsion of the upright shaft O' and overcome friction in turning the tower-top on its axis.

In so far as the tail-wheel Q prevented the windmill from readily shaping itself to sudden changes of wind it was inferior to the ordinary vane or to making the wheel act as its own vane by setting it behind the masts, as is sometimes done, instead of setting it in front, as we have shown. In order to obviate this difficulty in the use of tail-wheels and enable the tower-top to be turned independently without unduly straining connections, I use a friction connection between the worm-wheel R and shaft $t$. The disk $m$ is fastened rigidly to the shaft $t$, upon which the worm-wheel R fits loosely and is pressed against the disk $m$ by means of a spring $r$ and nut $r'$ on the upper end of the shaft $t$. The tension of the spring $r$ and amount of friction is regulated by means of the nut $r'$, and the motion of the worm-wheel R is imparted to the shaft $t$ by the friction between the worm-wheel and disk; but the shaft $t$ may turn without turning the worm-wheel R, as required when the direct action of the wind suddenly turns the windmill around its vertical axis. The friction between the disk $m$ and worm-wheel R should be sufficient to enable the tail-wheel Q to turn the windmill to the wind against friction of joints and torsion of the upright shaft O'. A second disk $m'$, loose on the shaft $t$, but prevented from turning thereon by means of a feather, may be placed between the spring $r$ and worm-wheel R for the purpose of increasing the driving-friction between the worm-wheel R and shaft $t$.

The tail-wheel Q, with frictional connection, as I have described, may be used in conjunction with a small vane Y', against which strong gusts of wind would act to shift the wheel to the changing direction of the wind more quickly than could the tail-wheel Q, which would serve to keep the wind-wheel from being turned out of wind by the torsion of the upright shaft during intervals of moderation in wind force; or the tail-wheel Q may be used similarly in conjunction with a wind-wheel placed behind the masts, so as to act as its own vane.

The tail-wheel Q, used with frictional connection, as I have shown and described, may be made conveniently small and inexpensive. The action of the tail-wheel Q is also made easier by placing it on one side of the windmill, as I have shown, so that the direct action of the wind against it helps to counteract the torsion of the upright shaft O'.

A special device for obtaining vertical reciprocating motion as required for operating an ordinary pump is shown in Fig. 2. A crank-wheel g is attached to a shaft h', supported in bearings secured to a bracket h, which is bolted to the mast J'. The crank-wheel g is furnished around its periphery with teeth like a spur-gear, and is driven by a pinion g', attached to the shaft O. Thus the crank-wheel g, which may drive a pump by means of a pitman in the ordinary way, is made to turn much more slowly than does the wind-wheel. In this way a small wind-wheel can be made to operate a much larger pump than it could if connected in the usual way by means of a crank attached directly to the shaft O, and it will not be necessary to check the speed of the wind-wheel to accommodate a pump, as the relative speed of the crank-wheel and shaft O can be made to suit the requirements of both pump and wind-wheel by using suitable relative sizes of pinion g' and crank-wheel g. Where a pump connects with a crank attached directly to the shaft of a windmill it usually happens that only a small fraction of the power which the wind-wheel is capable of developing is utilized, owing to the fact that the proper speed of pumps and the speed which the wind-wheel should have to effectually utilize the power of the wind do not correspond.

The shut-off device by means of which the wind-wheel may be stopped or its motion controlled from the ground, is shown in Fig. 5. The rod d', previously described, is fastened to a cross-piece u, attached to the top end of a sleeve U, which extends downward, passing through the casting T', socket t', and timber U', which acts as a guide, leaving the sleeve U free to turn with the tower-top or to move in a vertical direction. The top of the sleeve U is also guided by the ends of the cross-piece u, sliding freely in vertical guides u' on the masts J'. Each guide u' consists of two strips fastened to the mast J' each side of the cross-piece u. The lower end of the sleeve U is provided with a circular flange v, which fits loosely into a grooved shoe V', fastened to a rod y, provided with suitable guides Z Z'. The rod y terminates at its lower end in an eye to which is attached a cord or rod y' reaching to the ground or to some place where it may be conveniently reached from below. By this arrangement the vertical motion of the rod y' is communicated to the sleeve U and to the rod d' as required for stopping the wind-wheel or controlling its motion, and the arrangement of the shoe V' and flange V at the same time leaves the tower-top free to turn on its vertical axis. The vertical shaft O' passes loosely through the sleeve U, or a pump-rod may pass through the sleeve in the same manner.

Having thus fully described my invention, what I claim as new, and desire to secure by Letters Patent, is—

1. In a wind-wheel, in combination, the sail-supporting frame and the sails pivoted thereto, a connecting-head located in line with the axis of the wheel and connected to the sails, substantially as described, whereby its movement axially with respect to the wheel in one direction turns the sails one way and in the other direction turns them the opposite way, a lever pivoted on the wheel-frame, and a link connecting it to the connecting-head, said lever being capable of swinging about its pivot past the direct line from the said pivot to the pivot of the link on the connecting-head, whereby the continued movement of said lever about its pivot in one direction turns the sails first in one direction and then in the other, substantially as set forth.

2. In a wind-wheel, in combination, the sail-supporting frame and the sails pivoted thereto, a connecting-head located in line with the axis of the wheel and connected to the sails, substantially as described, whereby its movement axially with respect to the wheel in one direction turns the sails one way and in the other direction turns them the opposite way, a lever pivoted on the wheel-frame and a link connecting it to the connecting-head, said lever being capable of swinging about its pivot past the direct line from the said pivot to the pivot of the link on the connecting-head, whereby the continued movement of said lever about the pivot in one direction turns the sails first in one direction and then in the other, and centrifugal balls carried by the wheel and connected to said lever to swing it past said line as the balls depart from the center, whereby such centrifugal balls in moving continuously outward tend first to diminish and afterward to increase the angle of the sails to the plane of the wheel, substantially as and for the purpose set forth.

3. In combination, substantially as set forth, the sail-supporting frame and the sails pivoted thereto, the head B and the rods connecting it to the sails, respectively, the lever C, pivoted on the wheel-frame, and the link connecting it to the head, the centrifugal ball F and the rod X, which connects it to the lever C, having the stop G, and the spring E, engaged by the stop, whereby the sails are stopped from turning on their pivots until the speed of the wheel causes the force of the balls to overcome the resistance of the spring, substantially as set forth.

4. In combination, substantially as set forth, the wheel-frame, the sails pivoted thereto with their pivoted axes sufficiently aside from their middle lines, respectively, to cause the sails to assume the preferred position for starting, the head B and the rods connecting it to the sails, respectively, the lever C, pivoted on the wheel-frame, and the link connecting it to the head, the sum of the lengths of the lever and link being greater than the distance from the pivot of the lever to the junction of the link with the head when the sail is in the preferred position for starting, and the centrifugal ball F and the rod X, which connects it to the lever C, whereby the centrifugal force of the balls operates to turn the sails from the preferred position for starting into the preferred position for work, substantially as set forth.

5. In a wind-wheel, in combination with axially-separated front and rear flanges secured to the wheel-shaft and a rigid sail-supporting rim, a front series and a rear series of arms respectively uniting said front and rear flanges with said rim, said arms in each of said series having narrow edges and broad faces laterally inclined with the plane of said rim in similar direction and degree in both series of said arms, so as to present their narrow edges toward the relative direction of the flow of air between the sails when the wheel is in motion, substantially as and for the purpose herein set forth.

6. In a wind-wheel, in combination with a rigid sail-supporting rim and two axially-separated flanges secured to the wheel-shaft on opposite sides of the plane of said rim, two corresponding axially-separated series of arms with narrow edges and broad faces inclined both laterally and longitudinally to the plane of said rim with similar lateral inclination of arms in both of said series, the said two series of arms uniting, respectively, the said two flanges with said sail-supporting rim, substantially as and for the purpose herein set forth.

7. In a wind-wheel, in combination with the wheel-shaft and sails connected to said wheel-shaft by arms or supports having faces laterally inclined with the plane of said wind-wheel, a series of braces with broad faces and thin edges axially diverging from said wind-wheel to a flange on said wheel-shaft, the said braces having their broad faces laterally oblique with the plane of said wind-wheel, so as to present their thin edges toward the relative direction of the flow of air through the wind-wheel when in motion, substantially as herein set forth.

8. In combination with the wheel-frame having the hollow shaft O, the sails pivoted to the frame, the head B, and links which operate the sails, pivoted thereto and made rigid with the head B, whereby said links support the head, and the rod P, which operates the head, passing through the hollow shaft O and connected to the head B, and the links B' and levers which operate them, pivoted to the wheel-frame, said links being connected to the rod P at a distance from its connection with the head B, whereby the rod P is supported free of contact with the hollow shaft O, substantially as set forth.

9. In combination with the revolving tower-top and the wind-wheel mounted thereon, a tail-wheel, and a train of gearing which connects it to the tower-top, two consecutive wheels in said train having yielding frictional connection only, substantially as set forth.

10. In combination with the tail-wheel, the revolving tower-top and the fixed tower which supports it, said fixed tower having secured to it the circular rack S, the shaft T, journaled in the tower-top and carrying a pinion which meshes with said rack, and having secured to it the disks $m$ and $m'$, the spring $r$, and adjusting-nut $r'$, the wheel R, loose on said shaft between said disks, and the worm $n$ on the shaft of the tail-wheel and meshing with said wheel R, substantially as set forth.

11. In a wind-wheel, the wheel-frame comprising the concentric rims, and the sails located between said rims and pivoted therein, their pivots being threaded and screwed into correspondingly-threaded bearings in said rims, substantially as set forth.

THOMAS O. PERRY.

Witnesses:
J. H. MILLER,
GEO. O. SPOONER.